(12) United States Patent
Croy et al.

(10) Patent No.: US 12,401,684 B2
(45) Date of Patent: Aug. 26, 2025

(54) DETECTION AND PREVENTION OF SIDELOADED ATTACK CHAINS VIA CLOUD AND FUZZY HASHING

(71) Applicant: Microsoft Technology Licensing, LLC, Redmond, WA (US)

(72) Inventors: Jeremy Daniel Croy, Redmond, WA (US); Randal Patrick Treit, Snohomish, WA (US); Christopher Timothy Kirk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 240 days.

(21) Appl. No.: 18/172,198

(22) Filed: Feb. 21, 2023

(65) Prior Publication Data
US 2024/0283814 A1    Aug. 22, 2024

(51) Int. Cl.
*H04L 9/40* (2022.01)

(52) U.S. Cl.
CPC ........ *H04L 63/145* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 2021/0073374 A1* | 3/2021 | Mookken | G06F 21/54 |
| 2021/0200867 A1* | 7/2021 | Schmugar | G06F 21/572 |
| 2021/0297442 A1* | 9/2021 | Vasseur | H04L 63/1441 |

OTHER PUBLICATIONS

International Search Report and Written Opinion received for PCT Application No. PCT/US24/016061, May 8, 2024, 13 pages.

* cited by examiner

*Primary Examiner* — Cai Y Chen
(74) *Attorney, Agent, or Firm* — Workman Nydegger

(57) ABSTRACT

Detecting sideloaded attack chains. The method includes obtaining first telemetry data for a particular instance of a shared library. The first telemetry data is obtained from a first remote client system as a result of the first remote client system identifying the shared library as a known target of sideloaded attack chains. The first telemetry data for the particular instance of the shared library is compared to other telemetry data for other instances of the shared library obtained from other remote client systems to determine a similarity score for the first telemetry data as compared to the other telemetry data. Based on the similarity score, sideloaded attack chain conclusion information about the particular instance of the shared library is sent to the first remote client system.

20 Claims, 8 Drawing Sheets

_700_

Obtaining first telemetry data for a particular instance of a shared library, the first telemetry data related to a first remote client system as a result of the first remote client system identifying the shared library as a known target of sideloaded attack chains ⎯ 710

Comparing the first telemetry data for the particular instance of the shared library to other telemetry data for other instances of the shared library received from other remote client systems to determine a similarity score for the first telemetry data as compared to the other telemetry data ⎯ 720

Based on the similarity score, sending sideloaded attack chain conclusion information about the particular instance of the shared library to the first remote client system ⎯ 730

*Figure 7*

DETECTION AND PREVENTION OF SIDELOADED ATTACK CHAINS VIA CLOUD AND FUZZY HASHING

BACKGROUND

Background and Relevant Art

Computers and computing systems have affected nearly every aspect of modern living. Computers are generally involved in work, recreation, healthcare, transportation, entertainment, household management, etc. As computing systems continue to be ubiquitous, they become targets for adversaries to exploit for misappropriating personal data, corporate data, and financial data. This is often accomplished by the entities causing so-called computer malware to be loaded on to computing systems where the computer malware can access data, keystrokes, network communications, etc. Information obtained from this access can be forwarded to the adversaries where the information can be misused, such as for identity theft, financial theft, or even unauthorized sales of individuals' private information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of detecting sideloaded attack chains. The method includes obtaining first telemetry data for a particular instance of a shared library. The first telemetry data is obtained from a first remote client system as a result of the first remote client system identifying the shared library as a known target of sideloaded attack chains. The first telemetry data for the particular instance of the shared library is compared to other telemetry data for other instances of the shared library obtained from other remote client systems to determine a similarity score for the first telemetry data as compared to the other telemetry data. Based on the similarity score, sideloaded attack chain conclusion information about the particular instance of the shared library is sent to the first remote client system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 7 illustrates a method of detecting sideloaded attack chains from an antivirus cloud service perspective.

DETAILED DESCRIPTION

Figure 1:
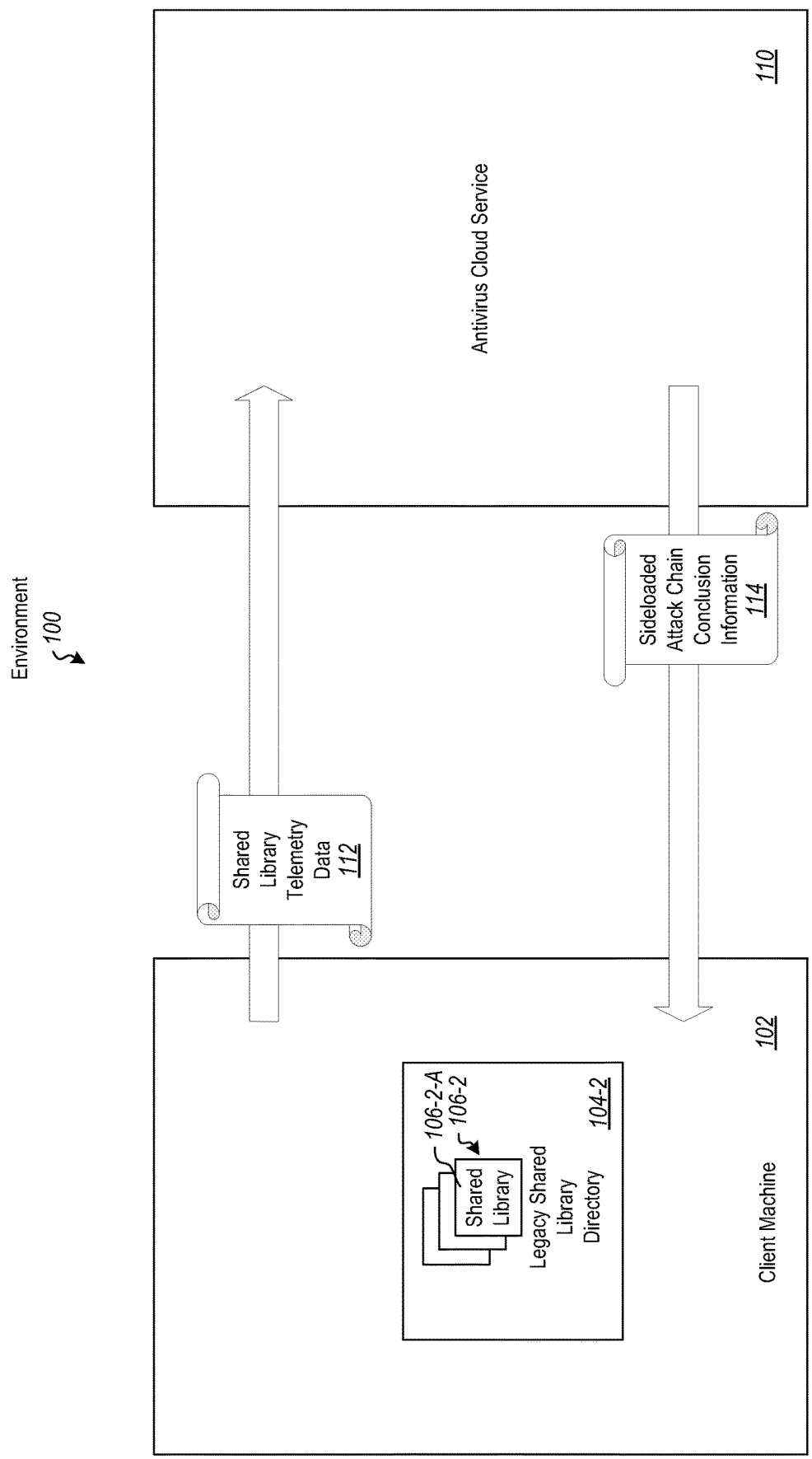
FIG. 1 illustrates a client machine and an antivirus cloud service used where sideloaded attack chains can be deployed and detected.

As noted above, computer malware have been, are, and will continue to be problematic in the computing space. Previous solutions for detecting malware have included comparing executable files to known malicious samples. One particular category of malware includes functionality for hijacking execution flow of legitimate applications. That is, harmful code can be injected into an otherwise authorized application execution to accomplish the purposes of the adversary.

Hijacking execution flow can be accomplished in programming environments where shared libraries are implemented. As background, shared libraries are useful for sharing code across multiple applications to implement common functionality across the applications. For example, certain shared libraries include executable code to accomplish certain network communication functionality. Alternatively, or additionally, certain shared libraries include functionality for performing specialized computations. Alternatively, or additionally, certain shared libraries include functionality for performing reads and/or writes to computer storage. Etc. Examples of shared libraries are often found having the following file extensions: .dll, .a, .so, .lib, .and/or la.

Shared libraries are placed in known locations where an application can execute code in the shared library as needed during the execution flow of the application. Note that shared libraries can be in one of a number of different locations. Therefore, applications are configured to search for the shared libraries using a search order. One typical search order is (1) using a current working directory where the application code is running; (2) using a well-know, legacy path location for libraries or particular libraries; and (3) an operating system directory.

Because of this ordering, an adversary can place a malware library in the well-known legacy path such that the malware library will be executed before a known good library in an operating system directory can be executed. Note that the malware library can be placed by various known attack methods including using credentials from phishing attacks, physical access attacks, malicious downloads, infected removable media attacks, etc.

Note that in the age of open-source software, where shared libraries can be compiled by various different users, it is difficult to identify when a particular instance of a shared library is malicious malware. In particular, source code is compiled by large numbers of users to create the executable libraries, such that there are many similar, but ultimately different, legitimate versions. Thus, in the context of a single instance of a particular shared library, it can be difficult to identify whether or not the instance of the particular shared library is legitimate. Thus, while previous malware detection systems have been able to identify malware by having known malicious files to compare new files to, in the case of shared libraries, due to the differences naturally caused by multiple different compilations, it is extremely difficult to identify and track known malicious files. This is due to the potentially large number of such files, and the diverse nature of such files. For example, each malicious file may be different from most or all other malicious files such that comparisons would be meaningless. Thus, a technical problem exists whereby it is difficult for antivirus systems to identify malicious shared libraries because of the dearth of comprehensive malicious samples to compare shared libraries to.

Embodiments illustrated herein implement functionality for detecting and mitigating sideloaded attack chains by identifying outliers from among multiple samples of shared libraries. That is, if an instance of a shared library differs significantly from multiple other instances of the shared library, the particular instance can be identified as malicious. In the examples illustrated herein, client and server examples are shown. In one end-to-end example, a client machine includes an antivirus client. The antivirus client is configured to identify shared libraries that are particularly vulnerable to sideloaded attack chains. When one of these shared libraries is accessed, telemetry data for the shared library can be generated and sent to an antivirus cloud service.

The antivirus cloud service obtains telemetry data from multiple different client machines. Thus, the antivirus cloud service will obtain telemetry data for multiple different instances of a particular shared library. The antivirus cloud service can compare telemetry data for the various instances to identify similarity of telemetry data. For example, the antivirus cloud service can use context piecewise hashing, locale sensitive hashing, unsupervised machine learning, etc. to identify outliers.

When telemetry data for a particular instance of a shared library is a significant outlier, that particular instance of the shared library can be identified as malicious. The antivirus cloud service can then inform the antivirus client at the client machine that the shared library is malicious and should be blocked. The antivirus client at the client machine is able to inform an application attempting to execute the shared library and/or inform an operating system attempting to execute the shared library that the shared library should be blocked, thus preventing the shared library from being executed at the client machine.

Referring now to FIG. 1, an overview example is illustrated. FIG. 1 illustrates an environment 100 including a client machine 102. The client machine 102 may be, for example, a computing system with hardware and software configured to run various applications that use shared libraries in the execution of the applications. As illustrated in FIG. 1, the client machine 102 includes a legacy shared library directory 104-2.

The legacy shared library directory 104-2 is a storage location in computer storage where a set of shared libraries 106-2 can be stored. As discussed previously, and as will be illustrated in more detail further herein, applications typically follow a search pattern when searching for a particular shared library. A sideloaded attack chain places malicious shared libraries in the legacy shared library directory 104-2. The legacy shared library directory 104-2, and similar directories, are included on client machines to ensure that the client machines are legacy compatible with legacy applications which were originally programmed to use such directories. In particular, a legacy shared library directory is typically located in a well-known directory path.

This allows software developers to the able to develop functionality for legacy applications.

Figure 2:
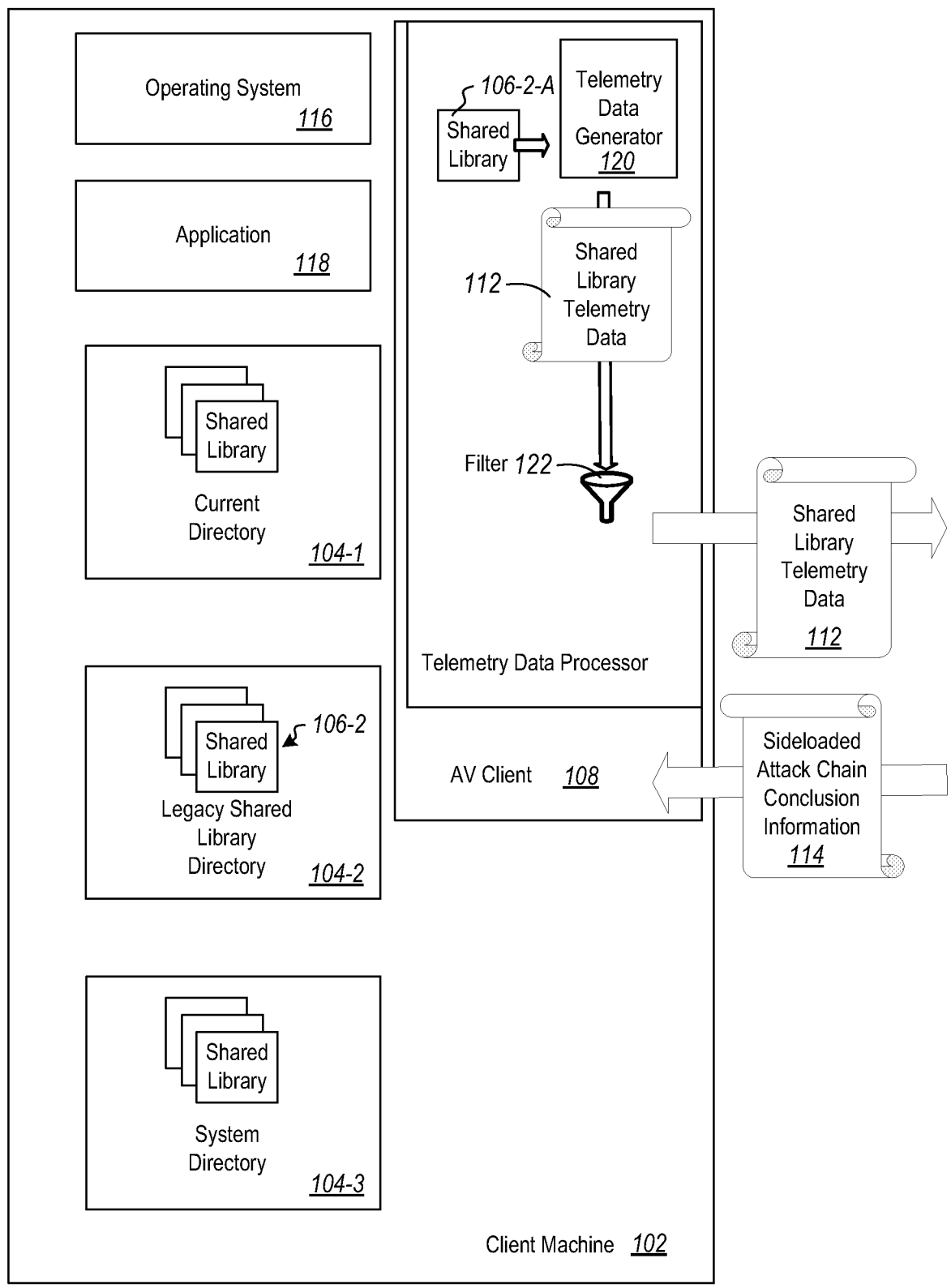
FIG. 2 illustrates additional details regarding the client machine.

As illustrated in FIG. 2, the client machine 102 typically has installed thereon an antivirus client 108. The antivirus client 108 is a software application running on computer hardware of the client machine 102. The antivirus client 108 is programmed to generate telemetry data. Returning once again to FIG. 1, telemetry data for a particular instance of a shared library 106-2-A is generated as illustrated by the shared library telemetry data 112.

The shared library telemetry data 112 is sent to the antivirus cloud service 110. As will be illustrated in more detail below, antivirus cloud service 110 is able to examine the shared library telemetry data 112, in conjunction with telemetry data obtained from other client machines, to identify if the particular instance of a shared library 106-2-A is malicious. In particular, the antivirus cloud service 110 includes programmatic instructions and hardware configured to determine if the shared library telemetry data 112 is significantly different than telemetry data for other instances of the particular shared library.

If the shared library telemetry data 112 indicates that the particular instance of a shared library 106-2-A is malicious, then the sideloaded attack chain conclusion information 114 includes a block indicator. The block indicator is obtained by the antivirus client 108 which can work in conjunction with applications and/or operating systems to prevent the particular instance of a shared library 106-2-A from being executed on the client machine 102.

Additional details are now illustrated. Attention is now directed to FIG. 2 which illustrates details with respect to the client machine 102. In this example, the operating system 116 and/or the application 118 use shared libraries to accomplish certain functionality on the client machine 102. For example, as discussed previously, shared libraries may be used to implement network functionality, computation functionality, storage access functionality, etc. To accommodate for legacy systems, shared libraries may be stored in a number of different locations, and search functionality for a particular shared library may follow a particular search order. For example, as illustrated in FIG. 2, a current directory 104-1, a legacy shared library directory 104-2, and a system directory 104-3 are included as locations where shared libraries may be stored. The operating system 116 and/or application 118 are configured to perform an ordered search for a particular shared library. In particular, most operating systems and applications will first search a current directory, such as the current directory 104-1. The current directory 104-1 is a storage location context on the client machine 102 where the operating system 116 and/or application 118 are executing.

If a particular desired shared library cannot be found in the current directory 104-1, then searching progresses to the legacy shared library directory 104-2. The legacy shared library directory 104-2 is a commonly known location where shared libraries can be stored for legacy programming.

If the particular desired shared library cannot be found in the legacy shared library directory 104-2, then searching progresses to the system directory 104-3. The system directory 104-3 is a file location specifically set aside for modern operating systems and applications.

However, the present application is directed to sideloaded attack chains whereby adversaries, knowing the well-known legacy shared library directory location, plant malicious shared libraries in the legacy shared library directory 104-2. Thus, this presupposes that a desired shared library is not in the current directory 104-1. Inasmuch as an ordered search for shared libraries is performed, this also prevents the search from progressing to the system directory 104-3, where a non-malicious copy of the shared library might be found.

In the sideloaded attack chain scenario, the particular instance of a shared library 106-2-A is found in the legacy shared library directory 104-2 and accessed for execution. The antivirus client 108 is configured to perform malware analysis on access. In this particular example, the antivirus client 108 provides the particular instance of a shared library 106-2-A to a telemetry data generator 120. The telemetry data generator 120 comprises software executing on computer hardware which creates and/or extracts metadata about the shared library 106-2-A. For example, such information may include path information where a shared library can be located, size information for a shared library, hashes of certain portions of the shared library, or other data that helps to identify characteristics of the shared library 106-2-A.

In the example illustrated in FIG. 2, the shared library telemetry data 112 is provided to a filter 122. The filter 122 is able to filter out certain instances of shared library telemetry data.

For example, in some embodiments the filter 122 filters out any instances of shared library telemetry data that are for application containers. In particular, when detecting and mitigating sideloaded attack chains, there is no need to block application containers as they themselves are not executable blocks of code.

In another example, the filter 122 may filter out any instances of resource only files. In particular, resource only files contain data while excluding executable code. As such, when detecting and mitigating sideloaded attack chains, there is no need to block shared libraries which only contain resources, and thus exclude executable code.

In another example, the filter 122 may filter out any instances of damaged files. In particular, any shared libraries that are damaged will already be blocked from execution due to their damaged state, and thus there is no need to block the damaged shared libraries to prevent sideloaded attack chains.

In another example, the filter 122 may filter out incomplete files. As with damaged files, incomplete files will already be blocked from execution due to being incomplete, and thus there is no need to block the incomplete shared libraries to prevent sideloaded attack chains.

In another example, the filter 122 may filter out signed files, which are signed in a trusted fashion. In this case, the security of the shared library has already been validated such that there is no risk of the shared library being used for a sideloaded attack chain.

In another example, the filter 122 may filter out files that are in certain predetermined file paths. In particular, it may be known that certain predetermined file paths are unlikely to contain shared library malware.

In a similar example, the filter 122 may filter out files that are not in certain predetermined file paths. In particular, it may be known that sideloaded attack chains are limited to certain file paths and thus if a shared library exists in a different file path, there is little risk of the shared library being malware.

In another example, the filter 122 may filter out files exceeding a predetermined size and/or not meeting a predetermined size threshold. In particular, it may be known that sideloaded attack chains are limited to using shared libraries within a particular size range, less than a particular size, or greater than a particular size. Thus, the filter 122 can filter any shared libraries that do not meet file size criteria that would be expected for sideloaded attack chains.

In another example, the filter 122 may filter out files being named with a number and a name of a code section.

In another example, the filter 122 may filter out library compiler artifacts.

In another example, the filter 122 may filter out libraries and library sections based on entropy. For example, libraries and library sections that have more than a predetermined level of randomness, or libraries and library sections that have less than a predetermined level of randomness may be filtered out.

Assuming that the shared library telemetry data 112 for the particular instance of a shared library 106-2-A passes through the filter 122, then the shared library telemetry data 112 can be forwarded to the antivirus cloud service 110.

Figure 3:
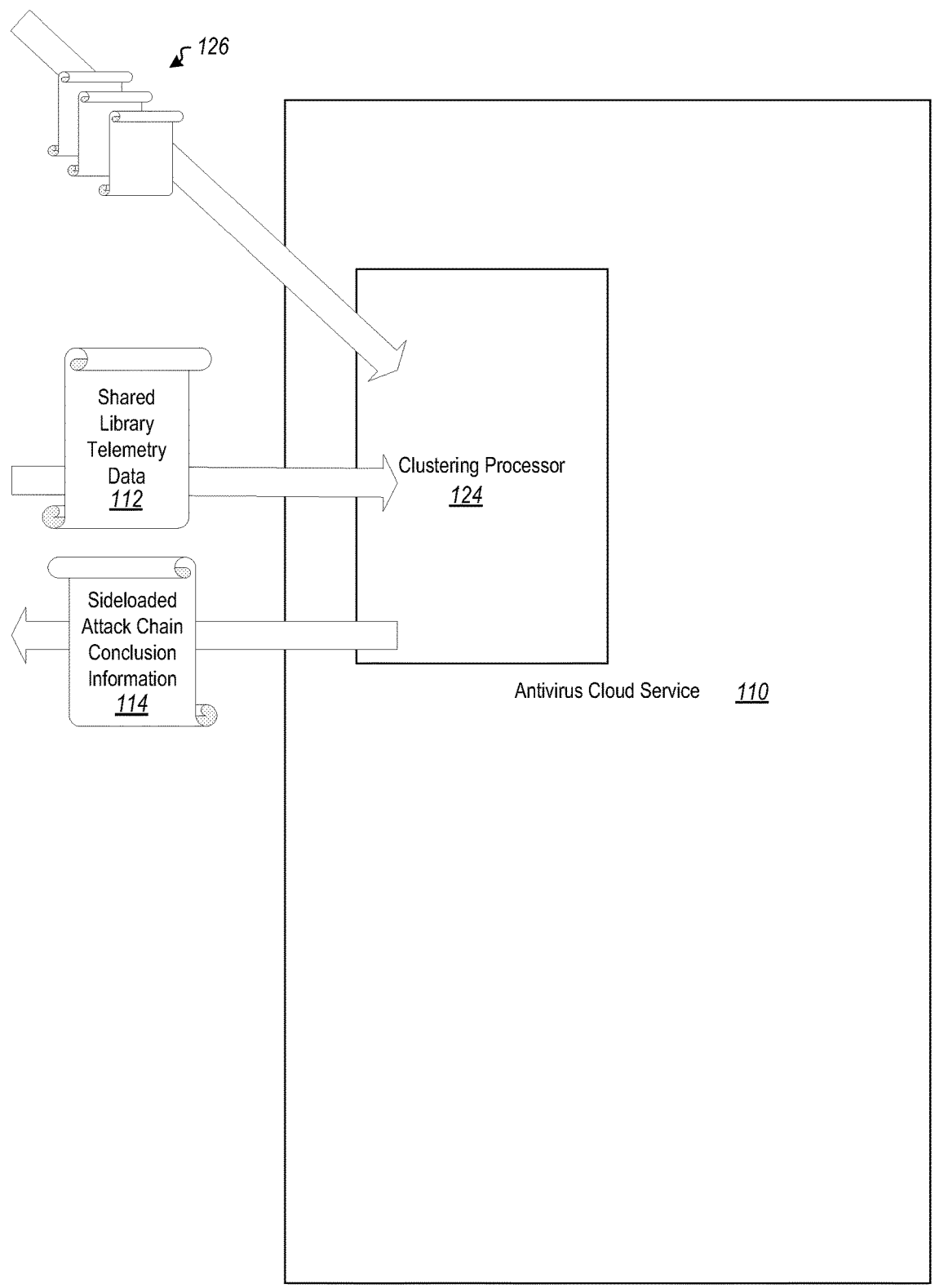
FIG. 3 illustrates additional details regarding the antivirus cloud service.

Referring now to FIG. 3, the antivirus cloud service 110 obtains the shared library telemetry data 112. The antivirus cloud service 110 includes a clustering processor 124. The clustering processor 124 comprises computer executable instructions executed by computer processors and other hardware such that the clustering processor 124 is configured to produce conclusion information about the shared library telemetry data 112. In the example illustrated in FIG. 3, the clustering processor 124 obtains not only the shared library telemetry data 112 but also a plurality of shared library telemetry data instances for a particular shared library 126 from a plurality of other client machines and corresponding antivirus clients. That is, for a particular shared library, telemetry data for instance of that shared library are obtained including the shared library telemetry data 112 and the plurality of shared library telemetry data instances for the particular shared library 126. The clustering processor 124 performs various clustering operations to determine how similar the shared library telemetry data 112 is to the plurality of shared library telemetry data instances for the particular shared library 126. The clustering processor may use context piecewise hashing, locale sensitive hashing, unsupervised machine learning, etc., to make determinations. As a result, the clustering processor 124 generates a similarity score for how similar the shared library telemetry data 112 is to the plurality of shared library telemetry data instances for the particular shared library 126.

Based on the clustering operations, the antivirus cloud service 110 can generate sideloaded attack chain conclusion information 114. As described previously, the sideloaded attack chain conclusion information 114 may include a block indicator, and allow indicator, or a request for additional information. A block indicator indicates to the client machine 102 that the particular instance of a shared library 106-2-A should be prevented from being executed. An allow indicator indicates that the particular instance of a shared library 106-2-A may be executed on the client machine 102. A request for additional information is made when the antivirus cloud service 110 is unable to determine whether or not the particular instance of a shared library 106-2-A is malware.

Figure 4:
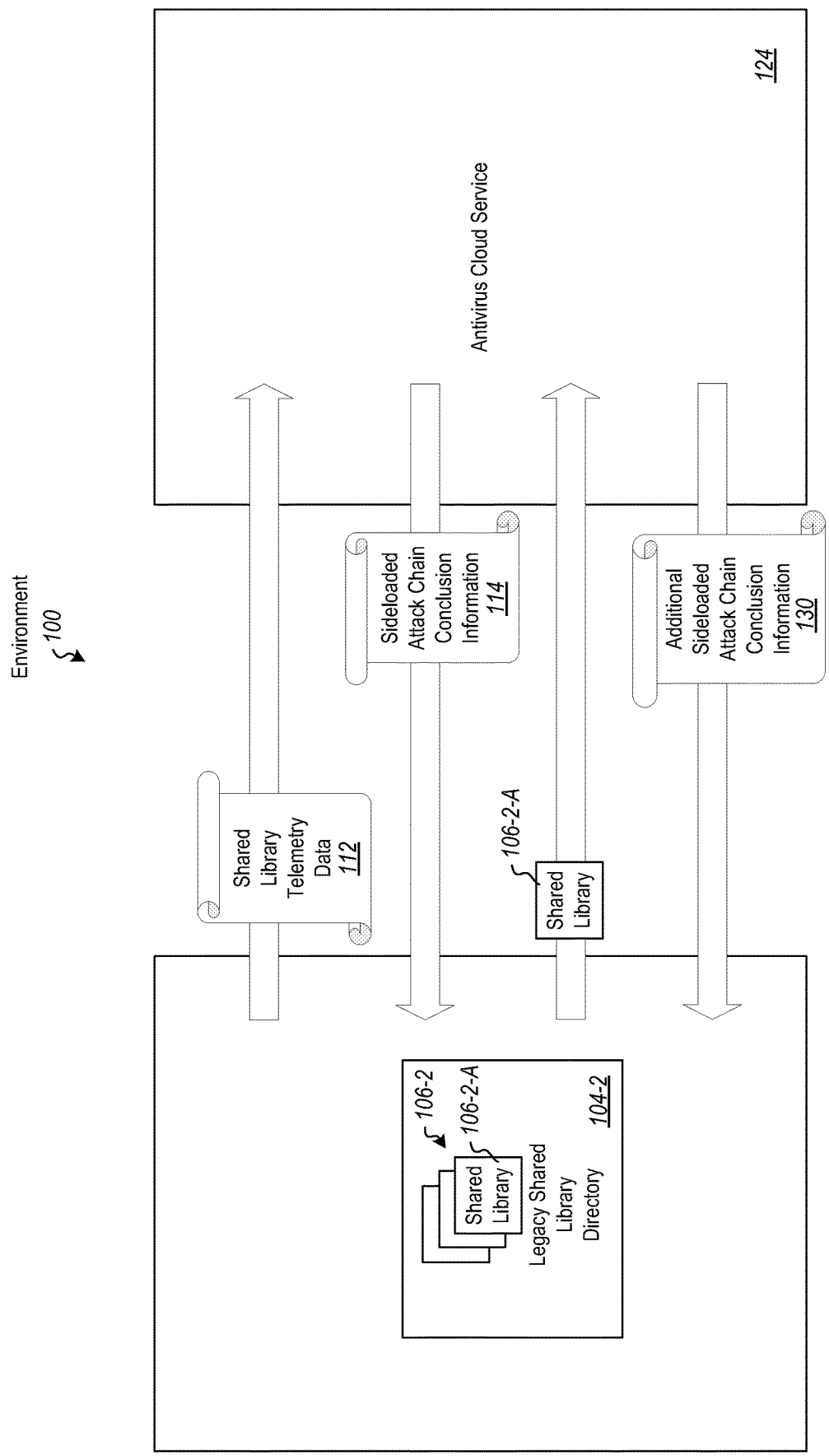
FIG. 4 illustrates additional details regarding the client machine and the antivirus cloud service with additional functionality for shared library analysis.
Figure 5:
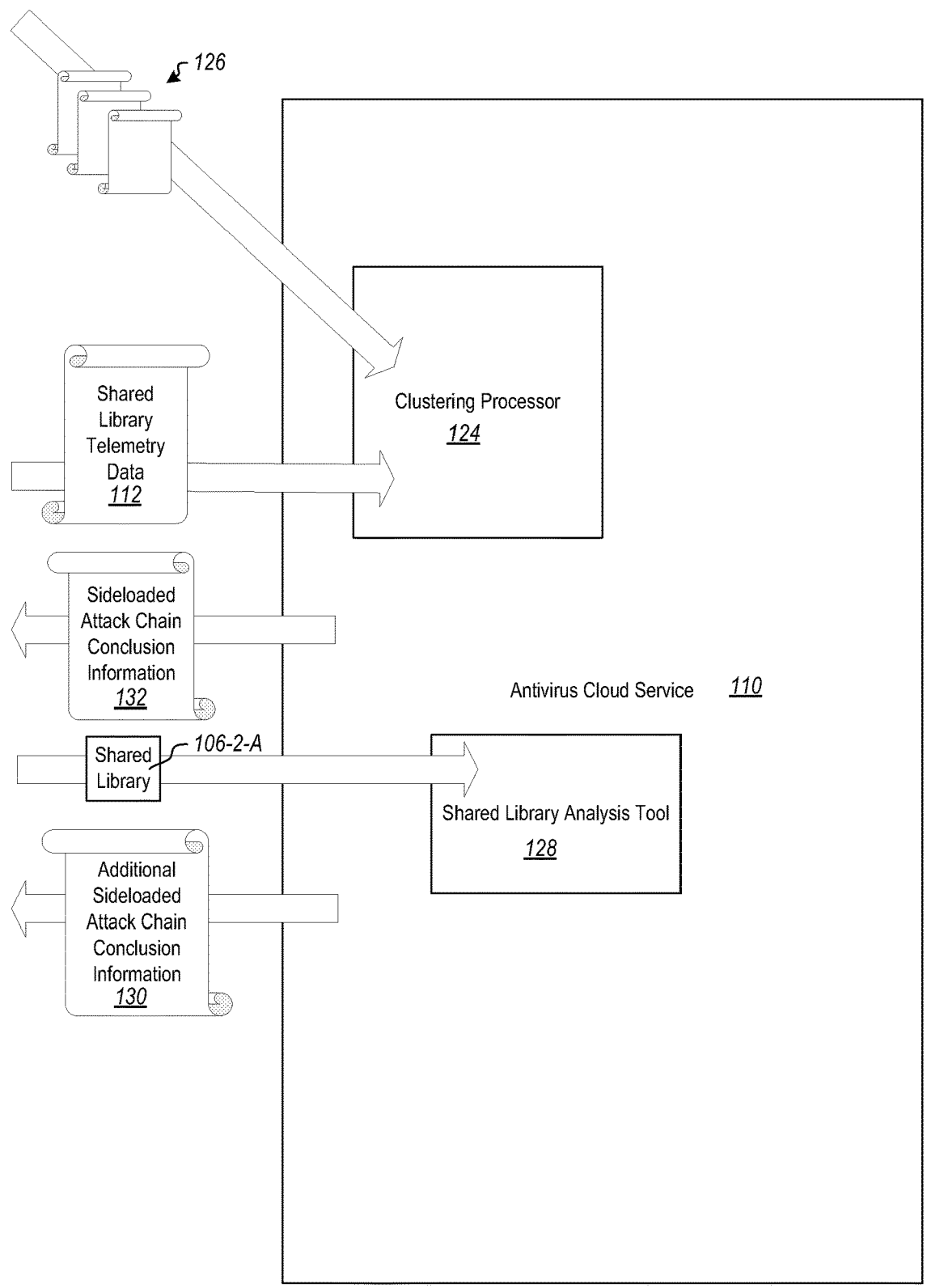
FIG. 5 illustrates additional details the antivirus cloud service with respect to analyzing the shared library.

As illustrated in FIG. 4, the particular instance of a shared library 106-2-A can be provided from the client machine 102 to the antivirus cloud service 110 to allow the antivirus cloud service 110 to further analyze the shared library 106-2-A. In particular, FIG. 5 illustrates a shared library analysis tool 128. The shared library analysis tool 128 can perform various functions on the particular instance of a shared library 106-2-A to determine whether or not the particular instance of a shared library 106-2-A is malware or not. For example, the shared library analysis tool 128 may execute the particular instance of a shared library 106-2-A in a sandbox execution environment to determine actions performed by a computing system when the particular instance of a shared library 106-2-A is executed.

Based on the shared library analysis tool analyzing the shared library 106-2-A, additional sideloaded attack chain conclusion information 130 is generated. This additional sideloaded attack chain conclusion information 130 generally includes a block indicator or an allow indicator which can be sent to the client machine 102 to cause the particular instance of a shared library 106-2-A to be blocked from execution, or to be allowed to execute on the client machine 102 respectively. Note that when it is determined that the particular instance of a shared library 106-2-A is allowed to execute, the shared library telemetry data 112 can be added to a corpus of telemetry data which can be used to analyze other instances of the shared library from other client machines.

Returning once again to the discussion of the clustering processor 124, in some embodiments, the clustering processor will delay analysis of the shared library telemetry data 112 until a sufficient amount of corresponding shared library telemetry data is obtained from other client machines. In particular, to ensure accuracy of sideloaded attack chain conclusion information, embodiments may require a particular amount of telemetry data for a particular shared library before determining the similarity of the shared library telemetry data 112 to the plurality of shared library telemetry data instances for a particular shared library 126.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
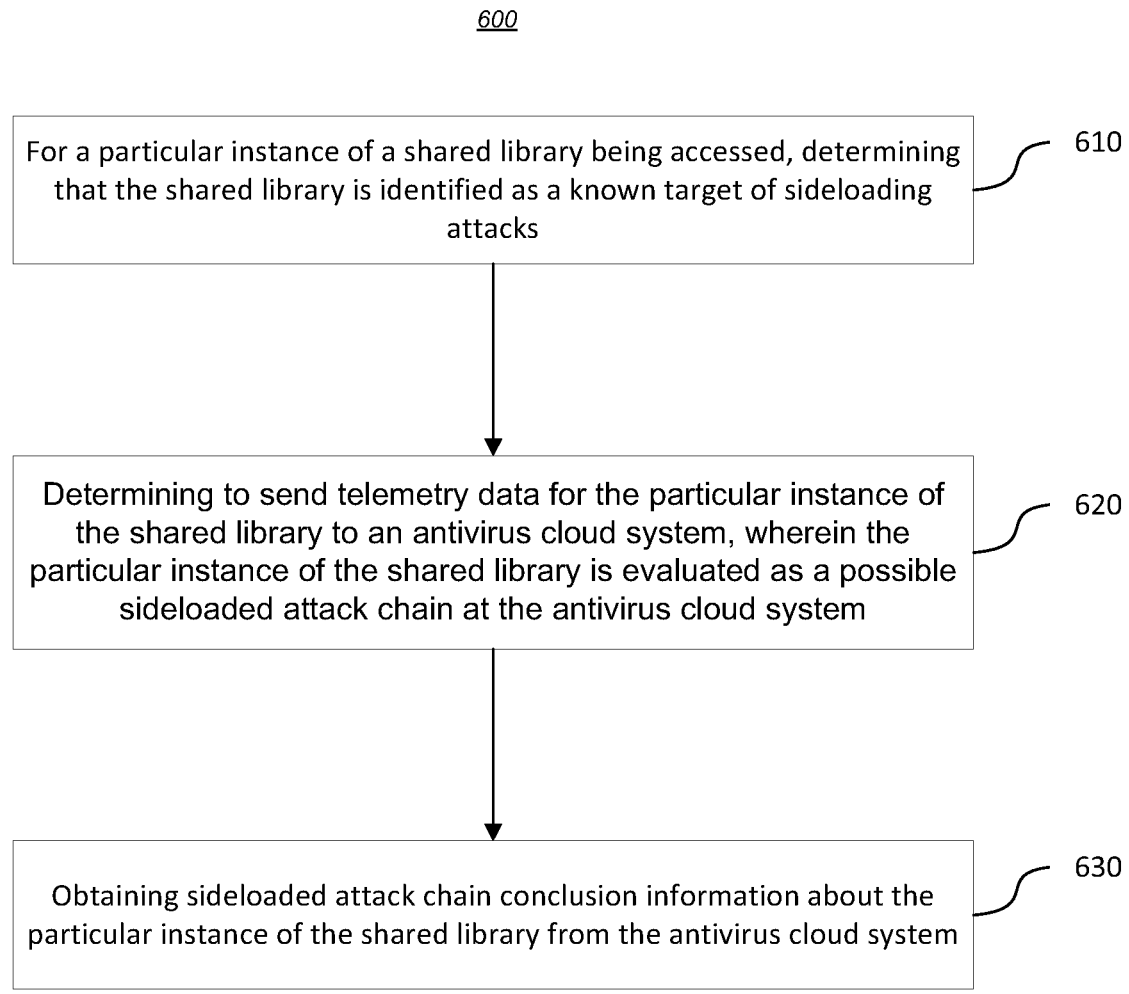
FIG. 6 illustrates a method of detecting sideloaded attack chains from a client perspective.

Referring now to FIG. 6, a method 600 is illustrated. The method 600 includes acts for detecting sideloaded attack chains. The method 600 includes, for a particular instance of a shared library being accessed, determining that the shared library is identified as a known target of sideloading attacks (act 610). This can be performed by determining that the particular instance of the shared library has a particular name, is located in a particular location, or has other characteristics identified for shared libraries that are known targets of sideloading attacks. This information may be gathered from various sources, such as customer reports, data traffic analysis, etc.

The method 600 further includes determining to send telemetry data for the particular instance of the shared library to an antivirus cloud system, wherein at the antivirus cloud system, the particular instance of the shared library is evaluated as a possible sideloaded attack chain (act 620).

The method 600 further includes obtaining sideloaded attack chain conclusion information about the particular instance of the shared library from the antivirus cloud system (act 630).

The method 600 may further include applying one or more filters to identify the particular instance of the shared library. In some such embodiments, the filters filter at least one of: application containers, resource only files, damaged files, incomplete files, signed files, files that are not top level files, files in predetermined file paths, files not in predetermined file paths, files exceeding a predetermined size threshold, files not meeting a predetermined size threshold, or files having file names exceeding a predetermined string length.

The method 600 may be practiced where obtaining sideloaded attack chain conclusion information about the particular instance of the shared library from the antivirus cloud system comprises obtaining at least one of a block indicator, an allow indicator, or a request for additional information. In some such embodiments, the request for additional information comprises a request to upload the particular instance of the shared library. In these cases, the method 600 may include the sending the shared library to the antivirus cloud system.

Referring now to FIG. 7, a method 700 of detecting sideloaded attack chains is illustrated. The method includes obtaining first telemetry data for a particular instance of a shared library, the first telemetry data obtained from a first remote client system as a result of the first remote client system identifying the shared library as a known target of sideloaded attack chains (act 710).

The method 700 further includes comparing the first telemetry data for the particular instance of the shared library to other telemetry data for other instances of the shared library obtained from other remote client systems to determine a similarity score for the first telemetry data as compared to the other telemetry data (act 720).

The method 700 further includes, based on the similarity score, sending sideloaded attack chain conclusion information about the particular instance of the shared library to the first remote client system (act 730).

The method 700 may be practiced where the sideloaded attack chain conclusion information comprises at least one of a block indicator, an allow indicator, or a request for additional information.

In some embodiments, the attack chain conclusion information comprises the request for additional information, including a request to upload the particular instance of the shared library.

The method 700 may further include analyzing the particular instance of the shared library; determining that the particular instance of the shared library is safe; and adding the first telemetry data to a corpus of telemetry data for known safe libraries for subsequent comparison to subsequently obtained telemetry data.

In an alternative or additional embodiment, the method 700 may further include analyzing the particular instance of the shared library; determining that the particular instance of the shared library is safe; and sending additional sideloaded attack chain conclusion information, including an allow indicator for the particular instance of the shared library, to the first remote client system.

In an alternative or additional embodiment, the method 700 may further include analyzing the particular instance of the shared library; determining that the particular instance of the shared library is harmful; and sending additional sideloaded attack chain conclusion information, including a block indicator for the particular instance of the shared library, to the first remote client system.

In some embodiments, the method 700 further includes clustering the first telemetry data with the other telemetry data and wherein the similarity score is based on the clustering.

The method 700 may be practiced where determining the similarity score comprises determining a similarity of the first telemetry data with portions of the other telemetry data known to belong to previously determined safe instances of the shared library.

The method 700 may be practiced where determining the similarity score comprises determining a similarity of the first telemetry data with portions of the other telemetry data known to belong to previously determined harmful instances of the particular shared library.

In some embodiments, the method 700 further includes determining that a predetermined threshold of the other telemetry data for other instances of the shared library have been obtained from the other remote client systems prior to comparing the first telemetry data for the particular instance of the shared library to the other telemetry data for the other instances of the shared library.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Example Computer/Computer Systems

Figure 8:
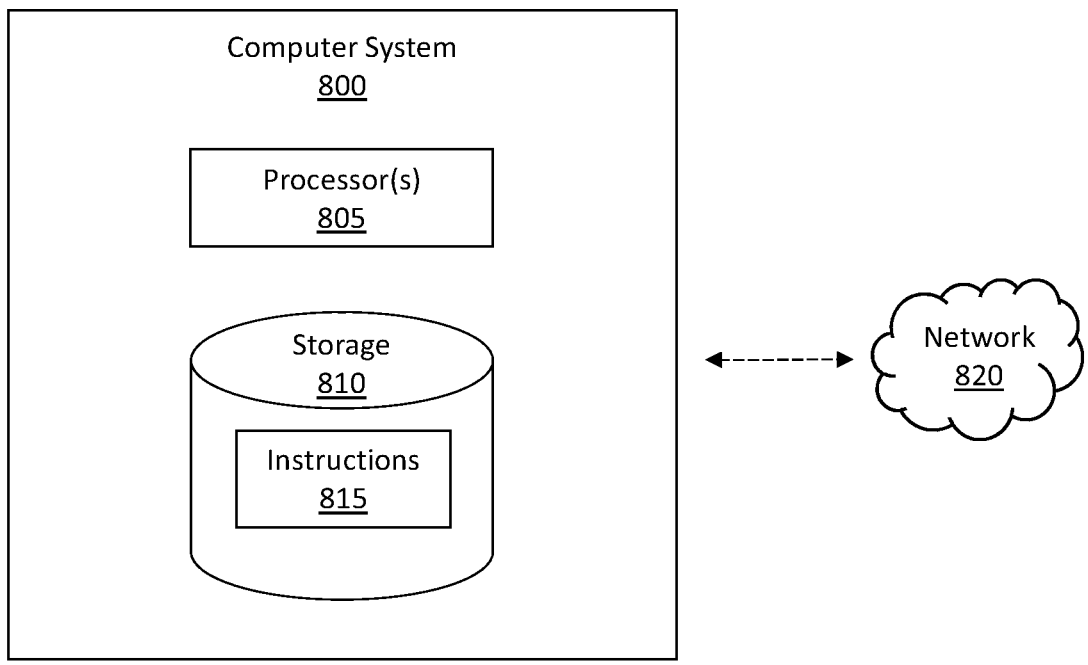
FIG. 8 illustrates an example computer system that can be configured to perform any of the disclosed operations.

Attention will now be directed to FIG. 8 which illustrates an example computer system 800 that may include and/or be used to perform any of the operations described herein. Computer system 800 may take various different forms. For example, computer system 800 may be embodied as a tablet, a desktop, a laptop, a mobile device, or a standalone device, such as those described throughout this disclosure. Computer system 800 may also be a distributed system that includes one or more connected computing components/devices that are in communication with computer system 800.

In its most basic configuration, computer system 800 includes various different components. FIG. 8 shows that computer system 800 includes one or more processor(s) 805 (aka a "hardware processing unit") and storage 810.

Regarding the processor(s) 805, it will be appreciated that the functionality described herein can be performed, at least in part, by one or more hardware logic components (e.g., the processor(s) 805). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 800. The different components, modules, engines, and services described herein may be implemented as objects or processors that execute on computer system 800 (e.g. as separate threads).

Storage 810 may be physical system memory, which may be volatile, non-volatile, or some combination of the two. The term "memory" may also be used herein to refer to non-volatile mass storage such as physical storage media. If computer system 800 is distributed, the processing, memory, and/or storage capability may be distributed as well.

Storage 810 is shown as including executable instructions 815. The executable instructions 815 represent instructions that are executable by the processor(s) 805 of computer system 800 to perform the disclosed operations, such as those described in the various methods.

The disclosed embodiments may comprise or utilize a special-purpose or general-purpose computer including computer hardware, such as, for example, one or more processors (such as processor(s) 805) and system memory (such as storage 810), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 800 may also be connected (via a wired or wireless connection) to external sensors (e.g., one or more remote cameras) or devices via a network 820. For example, computer system 800 can communicate with any number devices or cloud services to obtain or process data. In some cases, network 820 may itself be a cloud network. Furthermore, computer system 800 may also be connected through one or more wired or wireless networks to remote/separate computer systems(s) that are configured to perform any of the processing described with regard to computer system 800.

A "network," like network 820, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 800 will include one or more communication channels that are used to communicate with the network 820. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of detecting sideloaded attack chains, the method comprising:
    for a particular instance of a shared library being accessed, determining that the shared library is identified as a known target of sideloading attacks;
    determining to send telemetry data for the particular instance of the shared library to an antivirus cloud system, wherein the particular instance of the shared library is evaluated as a possible sideloaded attack chain at the antivirus cloud system;
    receiving shared library telemetry data;
    filtering out at least a portion of the shared library telemetry data to obtain the telemetry data for the particular instance of the shared library;
    providing the telemetry data for the particular instance of the shared library to an antivirus cloud system and;
    obtaining sideloaded attack chain conclusion information about the particular instance of the shared library from the antivirus cloud system.

2. The method of claim 1, wherein filtering out at least a portion of the shared library telemetry data filters at least one of telemetry data for: application containers, resource only files, damaged files, incomplete files, signed files, files in predetermined file paths, files not in predetermined file paths, files exceeding a predetermined size threshold, files not meeting a predetermined size threshold, files being named with a number and a name of a code section, library compiler artifacts, files having at least a certain entropy, or files having less than a certain entropy.

3. The method of claim 1, wherein obtaining sideloaded attack chain conclusion information about the particular instance of the shared library from the antivirus cloud system comprises obtaining an indicator selected from a group of indicators comprising a block indicator, an allow indicator, and a request for additional information.

4. The method of claim 3, wherein the request for additional information comprises a request to upload the particular instance of the shared library.

5. A method of detecting sideloaded attack chains, the method comprising:
    obtaining first telemetry data for a particular instance of a shared library, the first telemetry data related to a first remote client system as a result of the first remote client system identifying the shared library as a known target of sideloaded attack chains;
    comparing the first telemetry data for the particular instance of the shared library to other telemetry data for other instances of the shared library obtained from other remote client systems to determine a similarity score for the first telemetry data as compared to the other telemetry data; and
    based on the similarity score, sending sideloaded attack chain conclusion information about the particular instance of the shared library to the first remote client system, wherein the attack chain conclusion information comprises the request for additional information, including a request to upload the particular instance of the shared library.

6. The method of claim 5, further comprising sending additional attack chain conclusion information comprising at least one of a block indicator, an allow indicator, or a request for additional information.

7. The method of claim 5, further comprising:
    analyzing the particular instance of the shared library;
    determining that the particular instance of the shared library is safe; and
    adding the first telemetry data to a corpus of telemetry data for known safe libraries for subsequent comparison to subsequently obtained telemetry data.

8. The method of claim 5, further comprising:
    analyzing the particular instance of the shared library;
    determining that the particular instance of the shared library is safe; and sending additional sideloaded attack chain conclusion information, including an allow indicator for the particular instance of the shared library, to the first remote client system.

9. The method of claim 5, further comprising:
analyzing the particular instance of the shared library;
determining that the particular instance of the shared library is harmful; and
sending additional sideloaded attack chain conclusion information, including a block indicator for the particular instance of the shared library, to the first remote client system.

10. The method of claim 5, further comprising clustering the first telemetry data with the other telemetry data and wherein the similarity score is based on the clustering.

11. The method of claim 5, further wherein determining the similarity score comprises determining a similarity of the first telemetry data with portions of the other telemetry data known to belong to previously determined safe instances of the shared library.

12. The method of claim 5, further wherein determining the similarity score comprises determining a similarity of the first telemetry data with portions of the other telemetry data known to belong to previously determined harmful instances of the particular shared library.

13. The method of claim 5, further comprising determining that a predetermined threshold of the other telemetry data for other instances of the shared library have been obtained from the other remote client systems prior to comparing the first telemetry data for the particular instance of the shared library to the other telemetry data for the other instances of the shared library.

14. A system for detecting sideloaded attack chains, the system comprising:
an antivirus cloud service, wherein the antivirus cloud service comprises a clustering processor, wherein the clustering processor is configured to:
obtain first telemetry data for a particular instance of a shared library, the first telemetry data obtained from a first remote client system as a result of the first remote client system identifying the shared library as a known target of sideloaded attack chains; and
compare the first telemetry data for the particular instance of the shared library to other telemetry data for other instances of the shared library obtained from other remote client systems to determine a similarity score for the first telemetry data as compared to the other telemetry data; and
wherein the antivirus cloud service is configured, based on the similarity score, to send sideloaded attack chain conclusion information about the particular instance of the shared library to the first remote client system, wherein the attack chain conclusion information comprises the request for additional information, including a request to upload the particular instance of the shared library.

15. The system of claim 14, wherein the antivirus cloud service is configured, based on one other similarity scores, to send sideloaded attack chain conclusion information to the first remote client system, wherein the sideloaded attack chain conclusion information comprises a block indicator and an allow indicator, or a request for additional information.

16. The system of claim 14, further comprising a shared library analysis tool configured to analyze the particular instance of the shared library.

17. The system of claim 14, wherein the clustering processor is configured to determine that a predetermined threshold of the other telemetry data for other instances of the shared library has been obtained from the other remote client systems prior to comparing the first telemetry data for the particular instance of the shared library to the other telemetry data for the other instances of the shared library.

18. The method of claim 1, wherein the sideloaded attack conclusion information comprises a block indicator.

19. The method of claim 1, wherein the sideloaded attack conclusion information comprises an allow indicator.

20. The system of claim 14, wherein the clustering processor is configured to cluster the first telemetry data with the other telemetry data and wherein the similarity score is based on the clustering.

* * * * *